United States Patent
Yoshioka

(10) Patent No.: US 7,979,876 B2
(45) Date of Patent: Jul. 12, 2011

(54) RECEIVER, DISTRIBUTION METHOD OF RELEASE INFORMATION AND DISTRIBUTION METHOD OF CONTENTS

(75) Inventor: Kazuo Yoshioka, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 230 days.

(21) Appl. No.: 12/327,318

(22) Filed: Dec. 3, 2008

(65) Prior Publication Data

US 2009/0089853 A1    Apr. 2, 2009

Related U.S. Application Data

(63) Continuation of application No. 09/882,028, filed on Jun. 18, 2001, now Pat. No. 7,475,415.

(30) Foreign Application Priority Data

Aug. 17, 2000   (JP) ................ P2000-247509

(51) Int. Cl.
*H04N 7/167* (2011.01)
*H04N 7/16* (2011.01)
*H04N 7/173* (2011.01)

(52) U.S. Cl. ........... 725/31; 725/25; 725/105; 725/110; 725/135

(58) Field of Classification Search .......... 725/25, 725/31, 105, 110, 135
See application file for complete search history.

(56) References Cited

U.S. PATENT DOCUMENTS

| | | | |
|---|---|---|---|
| 5,818,935 A | 10/1998 | Maa | |
| 5,901,339 A | 5/1999 | Saito | |
| 7,177,424 B1 | 2/2007 | Furuya et al. | |

FOREIGN PATENT DOCUMENTS

| | | |
|---|---|---|
| JP | 56-106481 A | 8/1981 |
| JP | 04-223787 A | 8/1992 |
| JP | 06-132916 A | 5/1994 |
| JP | 09-162818 A | 6/1997 |
| JP | 162818 A9 | 6/1997 |
| JP | 10-032796 A | 2/1998 |
| JP | 10-32802 A | 2/1998 |
| JP | 032802 A1 | 2/1998 |
| JP | 10-174007 A | 6/1998 |
| JP | 2000-078555 A | 3/2000 |
| KR | 2000-76400 A | 12/2000 |
| WO | WO-98/43426 A1 | 10/1998 |
| WO | WO-99/43158 A1 | 8/1999 |
| WO | WO-00/44173 A1 | 7/2000 |

*Primary Examiner* — Hunter B Lonsberry
*Assistant Examiner* — John Schnurr
(74) *Attorney, Agent, or Firm* — Birch, Stewart, Kolasch & Birch, LLP

(57) ABSTRACT

In the case when password data (PW1) added to a TV broadcasting signal and password data (PW2) transmitted from an Internet connection section (2) have a predetermined correlation with each other, the display section (3) is allowed to display the corresponding contents normally. Therefore, accounting processes are imposed on the transmission of the password data (PW2) so that a normal displaying operation is charged in an indirect manner for each of the contents.

15 Claims, 7 Drawing Sheets

RECEIVER, DISTRIBUTION METHOD OF RELEASE INFORMATION AND DISTRIBUTION METHOD OF CONTENTS

CROSS-REFERENCE

This application is a Continuation of application Ser. No. 09/882,028 filed on Jun. 18, 2001, now U.S. Pat. No. 7,475, 415, and for which priority is claimed under 35 U.S.C. §120. This application also claims priority of Application No. P2000-247509 filed in Japan on Aug. 17, 2000 under 35 U.S.C. §119. The entire contents of all of the above applications are incorporated herein by reference.

BACKGROUND OF THE INVENTION

1. Field of the Invention

The present invention relates to a receiver which can receive contents distributed through a first communication system and a second communication system, for example, the Internet and the television (hereinafter, sometimes abbreviated as "TV") broadcasting, and also concerns a distribution method of contents using such a receiver.

In this case, contents refer to data, irrespective of analog or digital data, which can be distributed through at least one of these communication systems.

2. Description of the Background Art

Conventionally, a receiver which outputs contents distributed through two communication systems has been proposed. FIG. 9 is a block diagram that exemplifies a construction of a television receiver 101 that is provided with a display section which displays video signals from both of the TV broadcasting and the Internet.

TV broadcasting signals are received by a TV antenna 102, and inputted to a tuner 111 of a TV receiver 101. The tuner 111, which follows instructions from a microprocessor 114 that operates based upon a control program stored in a ROM 116, receives a TV broadcasting signal of a TV broadcasting channel specified by a remote commander 103, and outputs a audio signal and a video signal to a video/audio selection circuit 113. Moreover the tuner 111 inputs the video signal to a VBI (vertical blanking interval) data slicer 112. The VBI data slicer 112 extracts a character data signal for use in character broadcasting and a signal containing URL (uniform resource locators) information (hereinafter, referred to simply as "URL data") of a predetermined network domain which provides specific services on the Internet, and outputs these to the microprocessor 114. The microprocessor 114 stores the URL data in the RAM 115.

Upon receipt of an instruction for connection to an access point for providing network services from the remote commander 103, the microprocessor 114 reads the URL data from the RAM 115, and outputs a communication signal for connecting to a predetermined provider to a data modem 118. The data modem 118 modulates this communication signal to a predetermined frequency signal in conformity with the telephone line, and outputs this to the telephone line through a modular jack 104.

Data signals from a supplier of predetermined network services are transferred through the telephone line via a machine of a provider. The data signals, inputted through the modular jack 104, are subjected to a demodulation process in the data modem 118, and then inputted to the microprocessor 114. The microprocessor 114 processes the data signals thus demodulated, and generates video data and audio data. Then, the microprocessor 114 outputs the video data and audio data to the video encoder 117 and the audio encoder 119.

The video encoder 117 converts the video data inputted through the microprocessor 114 to a video signal, and outputs this to the video/audio selection circuit 113. Moreover, the audio encoder 119 converts the audio data inputted through the microprocessor 114 to an audio signal, and outputs this to the video/audio selection circuit 113.

The video/audio selection circuit 113 properly selects either of the video signal inputted from the tuner 111 and the video signal inputted from the video encoder 117, or both of them, and outputs the resulting signal to a video signal control circuit 121. Moreover, the video/audio selection circuit 113 selects either of the audio signal inputted from the tuner 111 and the audio signal inputted from the audio encoder 119, and outputs the resulting signal to an audio signal amplification circuit 120.

The video signal control circuit 121 converts the video signal to an RGB signal, and outputs this to an RGB signal amplification circuit 122. The RGB signal, outputted from the video signal control circuit 121 and amplified by the RGB signal amplification circuit 122, is then outputted to a CRT 123. Moreover, the audio signal, outputted from the video/audio signal selection circuit 113, is amplified by the audio signal amplification circuit 120, and then outputted to a speaker 124.

The television receiver 101, arranged as described above, extracts URL data that has been multiplexed on the vertical blanking interval of the TV video signal. Thus, in an attempt to display a home page related to a TV broadcasting program being currently displayed, the user is allowed to connect to an access point corresponding to the URL of the network service simply through an operation for instructing the connection to the Internet; thus, it is not necessary for the user to input the URL consisting of a plurality of characters by using a plurality of keys. This technique has been proposed, for example, in Japanese Patent Application Laid-Open No. 9-162818 (1997).

The information distributed through the TV broadcast, the TV broadcasting program typically, is basically distributed one-directionally. The resulting problems are that, when this service is charged, a contract is preliminarily required, and that, even when the contract has been made, the contract has been made for each of the broadcasting channels and it is difficult to make a selection as to whether or not a contract should be made for each of pieces of information (programs).

SUMMARY OF THE INVENTION

A receiver according to a first aspect of the present invention is provided with: a transmission section for receiving a first communication signal constituting contents through a first communication system; a transmitting and receiving section requesting a transmission of a second communication signal containing release information and of the second communication signal through a second communication system enabling bi-directional communications; a matching correlation detection section for making a judgement as to whether or not the release information has a predetermined matching correlation with limitation information for limiting a normal output of the contents; and an output section refraining from normally outputting at least one portion of the contents when the predetermined matching correlation is not detected, and, outputting the contents normally when the predetermined matching correlation is detected.

The receiver, of a second aspect of the present invention, which is related to first aspect, is characterized in that the first communication signal contains transmission source information for specifying a transmission source in order to receive the release information that has the predetermined matching correlation with the limitation information corresponding to the contents constituted by the first communication signal, and in that that the receiver receives the second communication signal automatically by obtaining the transmission source information contained in the first communication signal.

The receiver of a third aspect of the present invention, which is related to first aspect, is further provided with a storing section for storing the release information and discrimination information for discriminating the contents, and characterized in that the receiver receives the contents corresponding to the discrimination information stored in the storage section as the first communication signal, and, outputs the contents normally when the release information stored in the storage section and the limitation information corresponding to the contents have the predetermined matching correlation.

The receiver of a fourth aspect of the present invention, related to the third aspect, is further provided with an accumulation section for accumulating the first communication signal.

The receiver of a fifth aspect of the present invention, related to the fourth aspect, is characterized in that the storage section stores the first communication signal on condition that the contents corresponding to the discrimination information stored in the storage section as the first communication signal.

Preferably, the storage section stores the first communication signal on additional condition that the release information stored in the storage section and the limitation information corresponding to the contents have the predetermined matching correlation.

In the first through fifth aspects, for example, the first communication signal contains the limitation information corresponding to the contents constituted by the first communication signal.

More preferably, the output section may indicate that the communication is being carried out through the second communication system upon request and receipt of the second communication signal.

More preferably, the contents may include video data, music data and program data.

A distribution method of release information according to a sixth aspect of the present invention is characterized in that: the release information is transmitted in the second communication system allowing bi-directional communications; the limitation information limits a normal output of contents to be distributed in the first communication system; and the contents are normally outputted in the case when the release information has a predetermined matching correlation with the limitation information.

More preferably, the distribution of the release information is executed in response to a predetermined request.

A distribution method of release information according to a seventh aspect of the present invention is characterized in that: the contents are distributed through a first communication system; the limitation information limits a normal output of the contents to be transmitted in the first communication system; and the contents are normally outputted in the case when the release information has a predetermined matching correlation with the limitation information. In the seventh aspect, the contents are supplied together with transmission source information for specifying a transmission source for the second communication system that enables bi-directional communications, in order to obtain the release information.

Preferably, the contents are transmitted together with the limitation information corresponding to the contents.

In accordance with the receiver of the first aspect of the present invention, the request for and transmission of the second communication signal having release information required for obtaining a normal output of contents constituted by the first communication signal are carried out by using the second communication system enabling bi-directional communications; therefore, it is possible to easily provide conditions such as accounting processes, etc. when the receiver receives the second communication signal.

In accordance with the receiver of the second aspect of the present invention, it is possible to simplify the operation required for obtaining the release information.

In accordance with the receiver of the third aspect of the present invention, by preliminarily obtaining the release information, it is possible to eliminate the necessity of conducting the procedures for obtaining the release information each time the contents are received, and consequently to output the contents properly.

In accordance with the receiver of the fourth aspect of the present invention, it is not necessary to acquire the release information prior to the distribution of the corresponding contents.

In accordance with the receiver of the fifth aspect of the present invention, it is possible to automatically store the contents that can be normally outputted.

In accordance with the distribution method of the release information of the sixth aspect, the distribution method of the contents of the seventh aspect of the present invention, the request for and receiving the release information required for obtaining a normal output of contents are carried out by using the second communication system enabling bi-directional communications; therefore, it is possible to easily provide conditions such as accounting processes, etc. when the receiver receives the release information.

The present invention has been devised to solve the above-mentioned problems, and its objective is to provide a receiver and a distribution method of contents which make it possible to impose an account on each of contents that have been distributed through a predetermined communication system.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
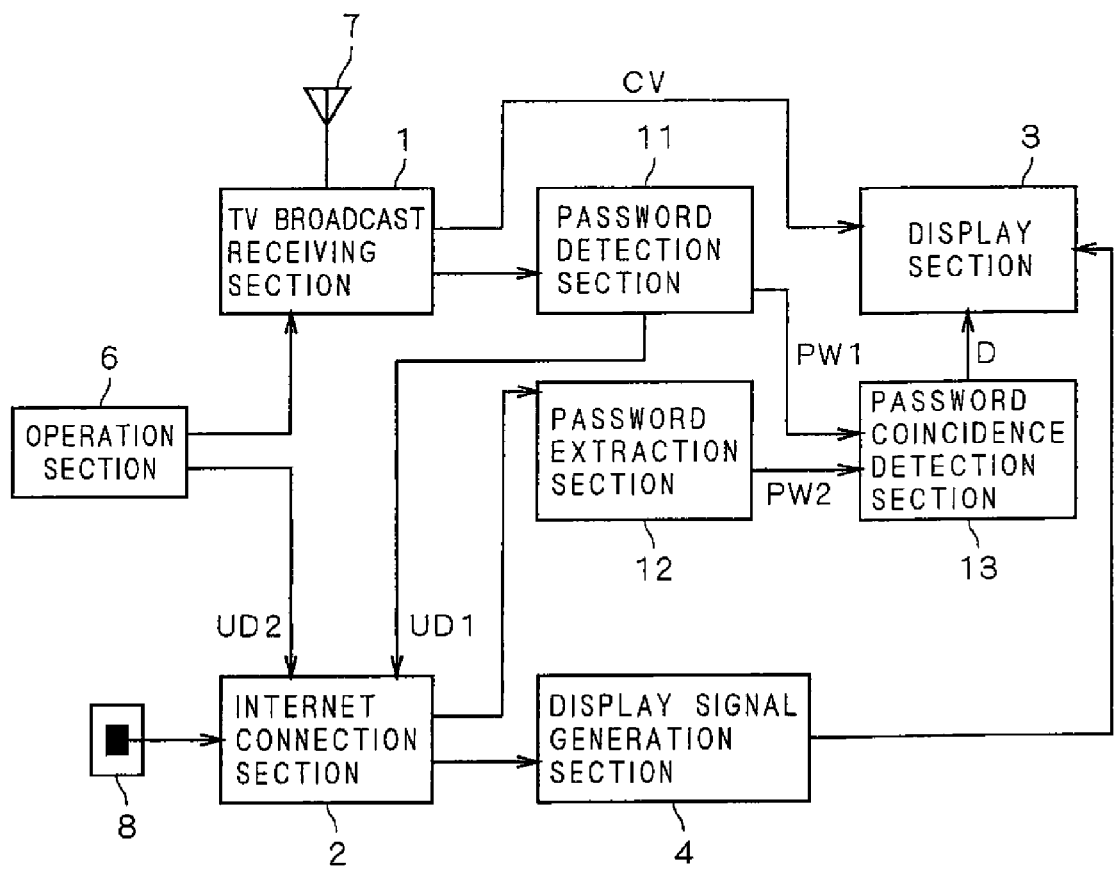
FIG. 1 is a block diagram that shows the construction of a receiver in accordance with a first preferred embodiment of the present invention.

FIG. 1 is a block diagram that shows the construction of a receiver 51 in accordance with the first preferred embodiment of the present invention. The receiver 51 is provided with a TV broadcast receiving section 1 for receiving TV broadcasting that relates to a first communication system, and an Internet connection section 2 for carrying out transmitting and receiving processes through the Internet that relates to a second communication system.

The TV broadcast receiving section 1 receives a broad cast wave transmitted through an antenna 7 via a ground broadcasting station or a satellite, and processes this by using the tuner circuit, detector circuit, etc., and outputs a composite video signal CV. The composite video signal CV is sent to a display section 3 installed in the receiver 51.

In some cases, in the composite video signal CV, password and URL information are multiplexed on, for example, the vertical blanking interval of the video signal. The composite video signal CV on which the password information is multiplexed constitutes contents having the password information as limitation information. The display section 3 is not allowed to display the contents having the limitation information in a normal manner unless release information having a predetermined matching correlation with the limitation information is utilized.

Figure 2:
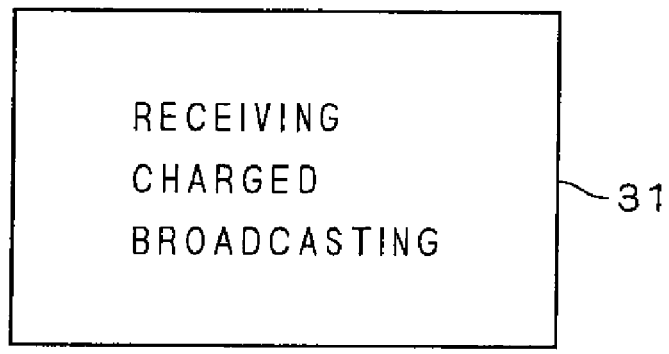
FIGS. 2 to 4 are drawings that shows the operation of the receiver in accordance with the first preferred embodiment of the present invention.

FIG. 2 is a drawing that exemplifies the screen 31 of the display section 3. In the case when the contents are not displayed normally, for example, as shown in FIG. 2, a specific image, such as "Receiving charged broadcasting", is displayed, or a scrambled image is displayed. Thus, the user of the receiver 51 is allowed to recognize that the contents are charged information.

The receiver 51 is further provided with a password detection section 11 at which the password information and URL information are detected from the composite video signal CV. In the case when the password information and URL information have been detected, decoding processes are further applied thereto, thereby obtaining password data PW1 and URL data UD1, respectively. The password data PW1 and the URL data UD1 are respectively given to a password coincidence detection section 13 and an Internet connection section 2, installed in the receiver 51.

Based upon the URL data UD1 sent from the password detection section 11, the Internet connection section 2 accesses a desired site through an external communication terminal 8 such as a modular jack, etc. More preferably, triggered by the input of the URL data UD1, the Internet connection section 2 is allowed to automatically access the corresponding site, thereby simplifying the operation.

Additionally, the user may input the URL data UD 2 by using the operation section 6 so that the access is made to the corresponding site so as to get release information from the site. This operation section 6 may be used by the user upon carrying out controlling processes on the TV broadcast receiving section 1, for example, changes in the broadcasting channels.

Figure 3:
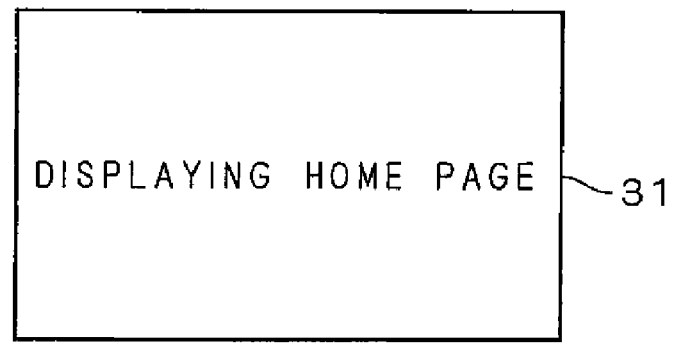

The screen data of the accessed site is sent to a display signal generation section 4 through the Internet connection section 2 at which it is converted to a signal used for displaying the display section 3. Based upon the signal sent from the display signal generation section 4, the display section 3 displays the screen of the information supplier of the site. FIG. 3 is a drawing that exemplifies the screen 31 of the display section 3, thereby displaying a screen indicating that the communication is being carried out through the Internet, that is, for example, the home page of the corresponding site.

The site corresponding to the URL data UD1 displays a procedure for obtaining the corresponding release information. For example, following the procedure displayed on the home page of the site, a number of the credit card, an account number of the bank, and a pass number and so on are inputted so that password data information with respect to the contents related to the obtained URL data UD1 is distributed through the Internet. In other words, the inputting action by the user of the receiver 51 for allowing the site to carry out the accounting process is equal to a transmitting process for requesting the distribution of the release information.

The password data information, obtained from the site, is sent to a password extraction section 12 through the Internet connection section 2 at which the password data PW2 is extracted and decoded. The password data PW2 is sent to the password coincident detection section 13. The password coincident detection section 13 makes a judgment as to whether or not the password data PW2 sent from the password extraction section 12 has a predetermined correlation with the password data PW1 sent from the password detection section 11, for example, whether or not the password data PW1, PW2 match with each other, and sends the resulting coincident detection signal D to the display section 3.

Figure 4:

The display section 3 receives the coincident detection signal D, and if it shows that there is a predetermined correlation between the password data PW1 and PW2, displays the contents with proper view and audio. FIG. 4 is a drawing that exemplifies a screen 31 of the display section 3. When the contents are allowed to be given with proper view and audio, the broadcasting contents are displayed. However, when the coincident detection signal D does not show the existence of the above-mentioned correlation, the display section 3 refrains from normally outputting the contents, e.g., the screen 31 shown in FIG. 2, or the scrambled image is displayed.

As described above, in the present preferred embodiment, the password PW1 serving as the limitation information is multiplexed for each of the contents distributed through the TV broadcasting, and the password PW2 serving as the release information and having a predetermined correlation with the limitation information is obtained through the Internet so that the contents are given with normal view and audio. Moreover, in the Internet which enables bi-directional transmissions, during the operation to obtain the release information, the above-mentioned data used for accounting processes can be requested. Therefore, although in an indirect manner, it is possible to easily carry out the accounting processes for each of the contents. In other words, it is possible to easily provide conditions required for a normal display for the contents.

Figure 5:
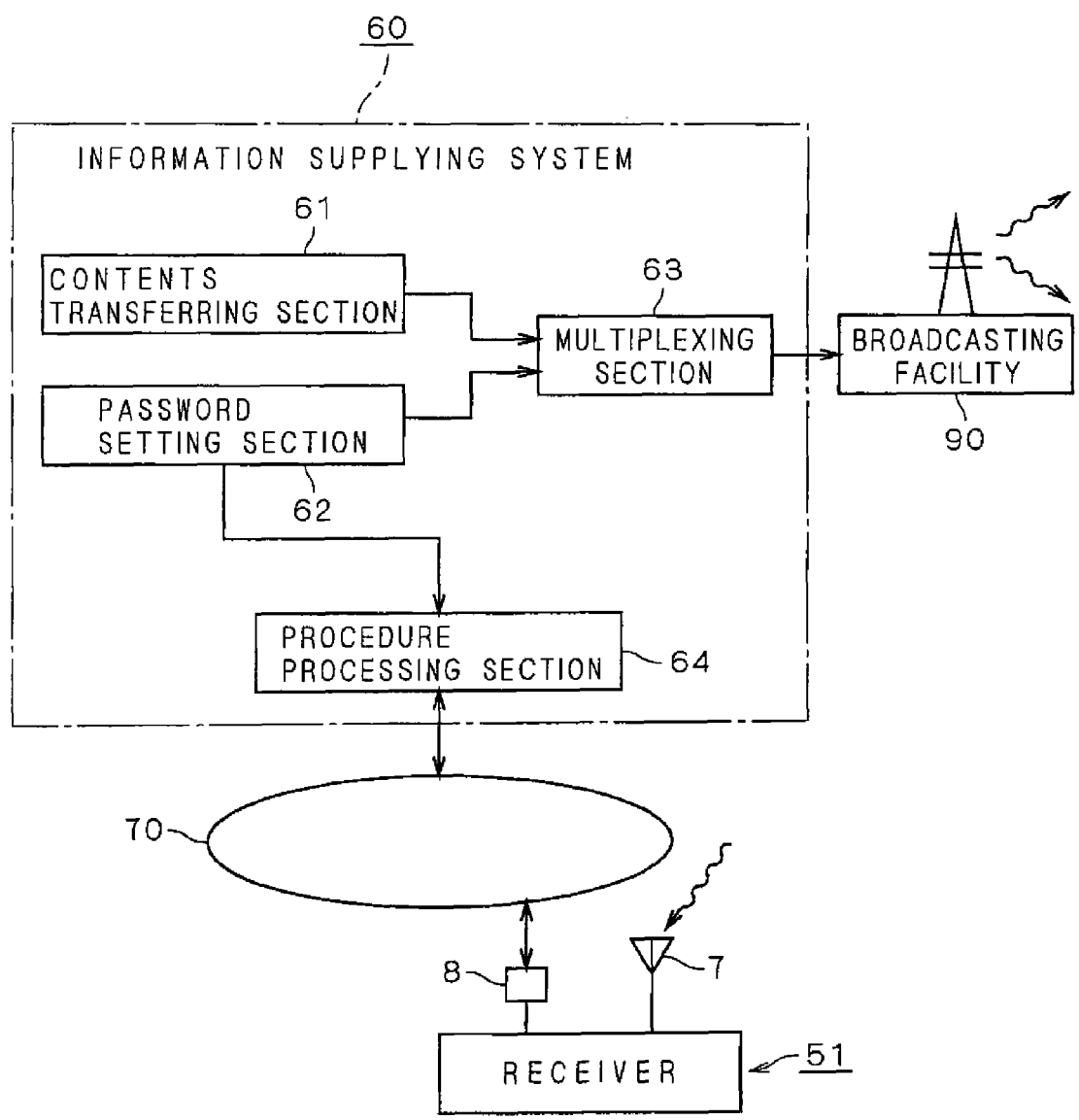
FIG. 5 is a block diagram that shows one aspect of the first preferred embodiment of the present invention.

FIG. 5 is a block diagram that shows a case in which the transmission source distributing the contents of a TV broadcasting program and the transmission source distributing the release information on the Internet are the same. An information supplying system 60 is provided with a contents transferring section 61 from which the contents of the TV broadcasting program are obtained. Here, the information supplying system 60 is also provided with a password setting section 62 from which the limitation information and release information having a predetermined correlation with this information are obtained.

In a multiplexing section 63 provided in the information supplying system 60, the contents of the TV broadcasting program and the password serving as limitation information (corresponding to the password PW1 in the case of FIG. 1) is multiplexed and supplied to a TV broadcasting facility 90. The TV broadcasting facility 90 provides broadcasting transmitted through a ground broadcasting station or a satellite, to distribute the contents in a one-directional manner.

The information supplying system 60 is also provided with a procedure processing section 64 from which a password (corresponding to the password PW2 in the case of FIG. 1) serving as the release information is distributed to a communication network 70 such as the Internet.

The receiver 51 receives the TV broadcasting contents through the antenna 7, and also connects to the communication network 70 through the external communication terminal 8.

Figure 6:
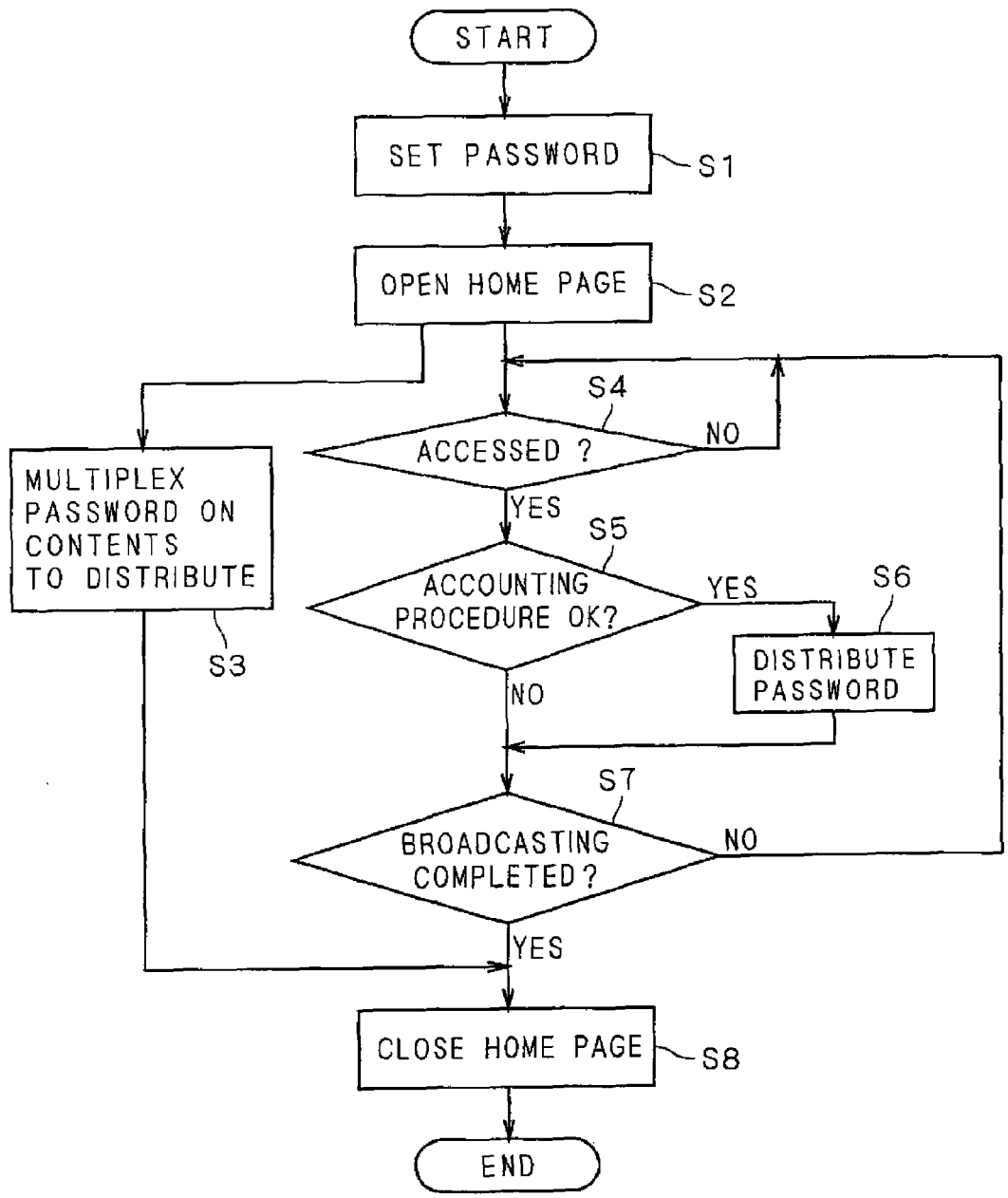
FIG. 6 is a flow chart that shows the operation of the first preferred embodiment of the present invention.

FIG. 6 is a flow chart that shows the operation of the information supplying system 60. At step S1, limitation information and release information having a predetermined correlation with each other are set as passwords. At step S2, a desired site is set so as to be accessible, that is, for example, a home page is opened. At step S3, the password for limitation information is multiplexed on TV broadcasting contents, and distributed.

At step S4, a detection is made as to whether or not there is any access to the site set at step S2. If there is not any access, the sequence stops at that stage and stands by, and if there is any access, the sequence proceeds to step S5 at which a judgment is made as to whether or not an accounting process has been made. If the accounting process has been made, then the password for release information is distributed at step S6.

If the accounting process has not been made, or if the password has been distributed, the sequence proceeds to step S7 at which a judgment is made as to whether or not the TV broadcasting contents on which the limitation information having a predetermined correlation with the release information is multiplexed has been finished. If the contents have been finished, the sequence proceeds to step S8, and if not, the sequence returns to step S4.

In the case when the TV broadcasting contents have been finished, since the supply of the release information is no longer required, the supply of the release information is completed at step S8. For example, the home page, opened at step S2, is closed.

In the present invention, the distribution source of the TV broadcasting contents and the distribution source of the release information on the Internet are not necessarily the same.

Second Preferred Embodiment

Figure 7:
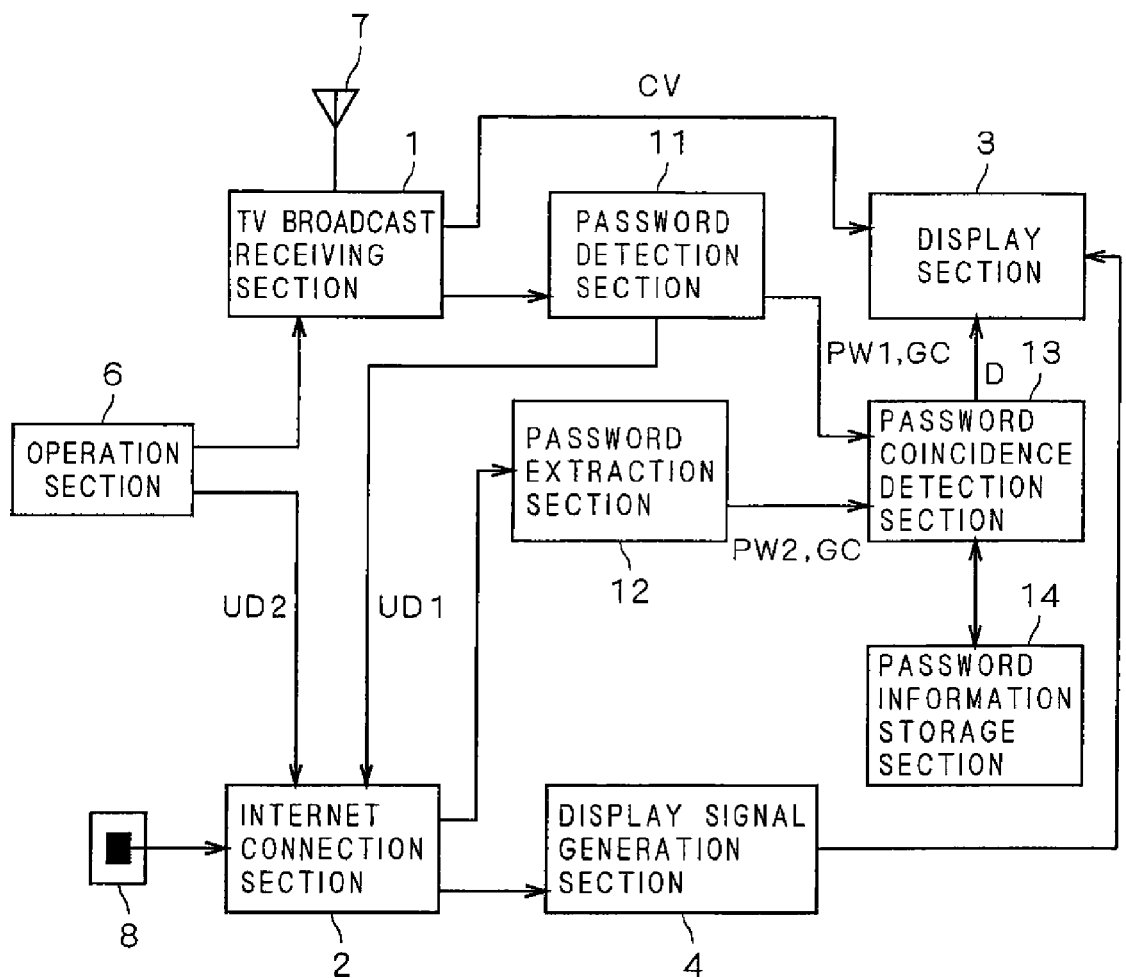
FIG. 7 is a block diagram that shows the construction of a receiver in accordance with a second preferred embodiment of the present invention.

FIG. 7 is a block diagram that shows the construction of a receiver 52 in accordance with the second preferred embodiment of the present invention. The receiver 52 has an arrangement in which a password information storing section 14 is added to the arrangement of the receiver 51 of the first preferred embodiment.

The user of the receiver 52 preliminarily obtains password information serving as release information from a predetermined site through the Internet. The password data PW2, acquired from the password thus obtained, is stored in the password information storing section 14 together with the contents on which the password PW1 having a predetermined correlation with the password data PW2 is multiplexed, for example, data code (program code) GC for identifying the corresponding TV broadcasting program. The data code GC is also obtainable from the above-mentioned site, for example, through the home page.

Upon receipt of the TV broadcasting contents, the password detection section 11 detects the password data PW1 together with the data code GC of the contents on which password information corresponding to the password data PW1 is multiplexed, and outputs these to the password coincident detection section 13. Upon receipt of the password data PW1 and the data code GC, the password coincident detection section 13 confirms whether or not there are the password data PW2 having a predetermined correlation with the password data PW1 and the coincided data code GC stored in the password information storing section 14. Then, it sends the coincident detection signal D indicating whether or not they are stored to the display section 3. The display section 3 makes a judgment as to the contents of the coincident detection signal D, and determines whether or not the video signal sent from the TV broadcasting signal receiving section 1 is to be normally displayed.

As described above, by preliminarily obtaining the release information, it becomes possible to eliminate the necessity of conducting the procedure for obtaining the release information each time the TV broadcasting signal receiving section 1 receives the contents, and consequently to properly display the contents on the display section 3.

The TV broadcasting signal is transmitted in one-directional manner, and the timing of transmission is one-directionally determined by the transmission side. Therefore, in the case when, every time required information is received, a procedure for getting the corresponding release information has to be conducted, required information might be missed. In contrast, in the present preferred embodiment, the release information has been preliminarily obtained prior to the distribution of the corresponding contents, it is possible to prevent such a problem, and consequently to properly view the contents at a desired time.

It is of course possible to request the procedure of accounting processes at the time when the release information is preliminarily obtained prior to the TV broadcasting.

Third Preferred Embodiment

Figure 8:
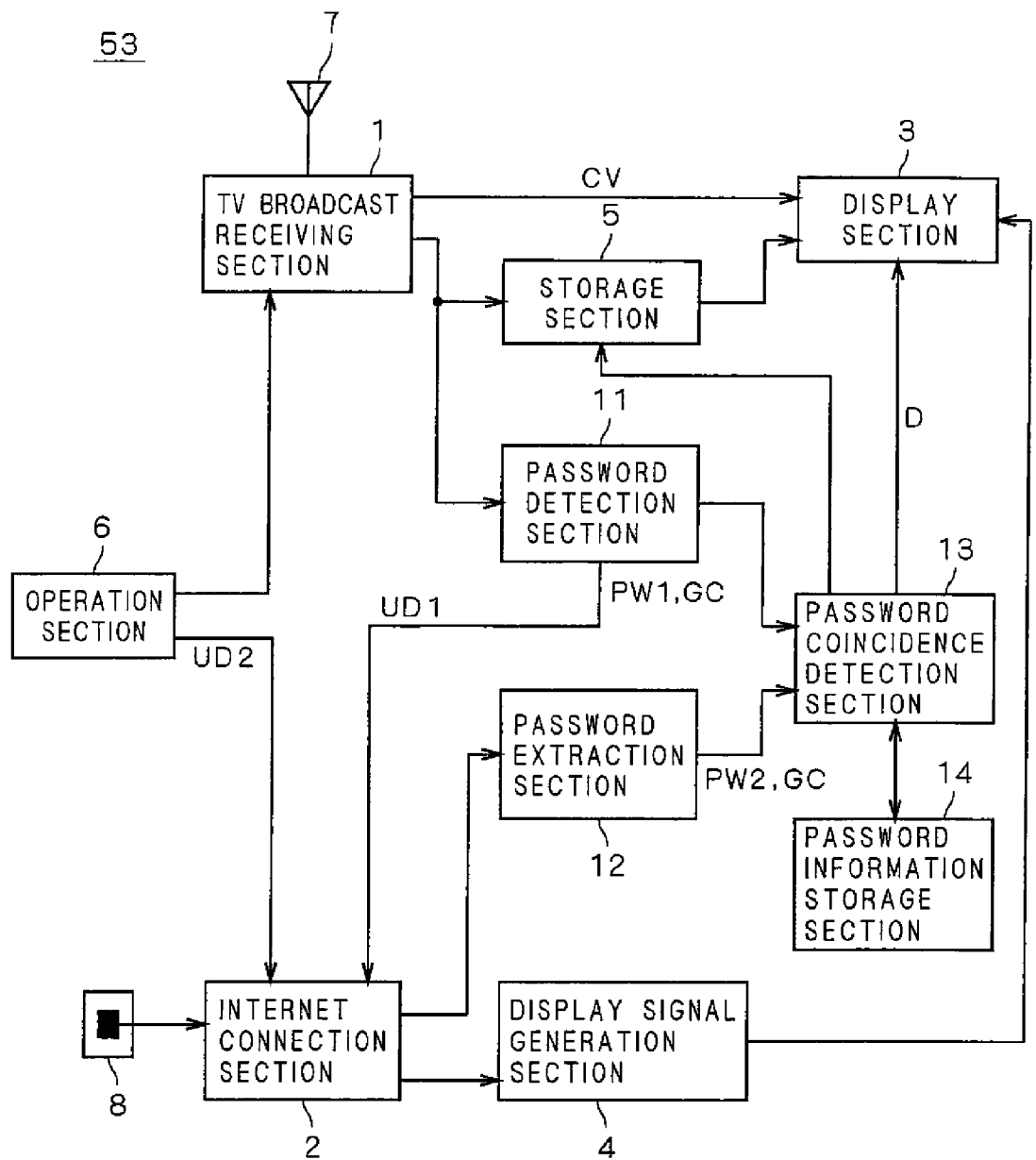
FIG. 8 is a block diagram that shows the construction of a receiver in accordance with a third preferred embodiment of the present invention.
Figure 9:
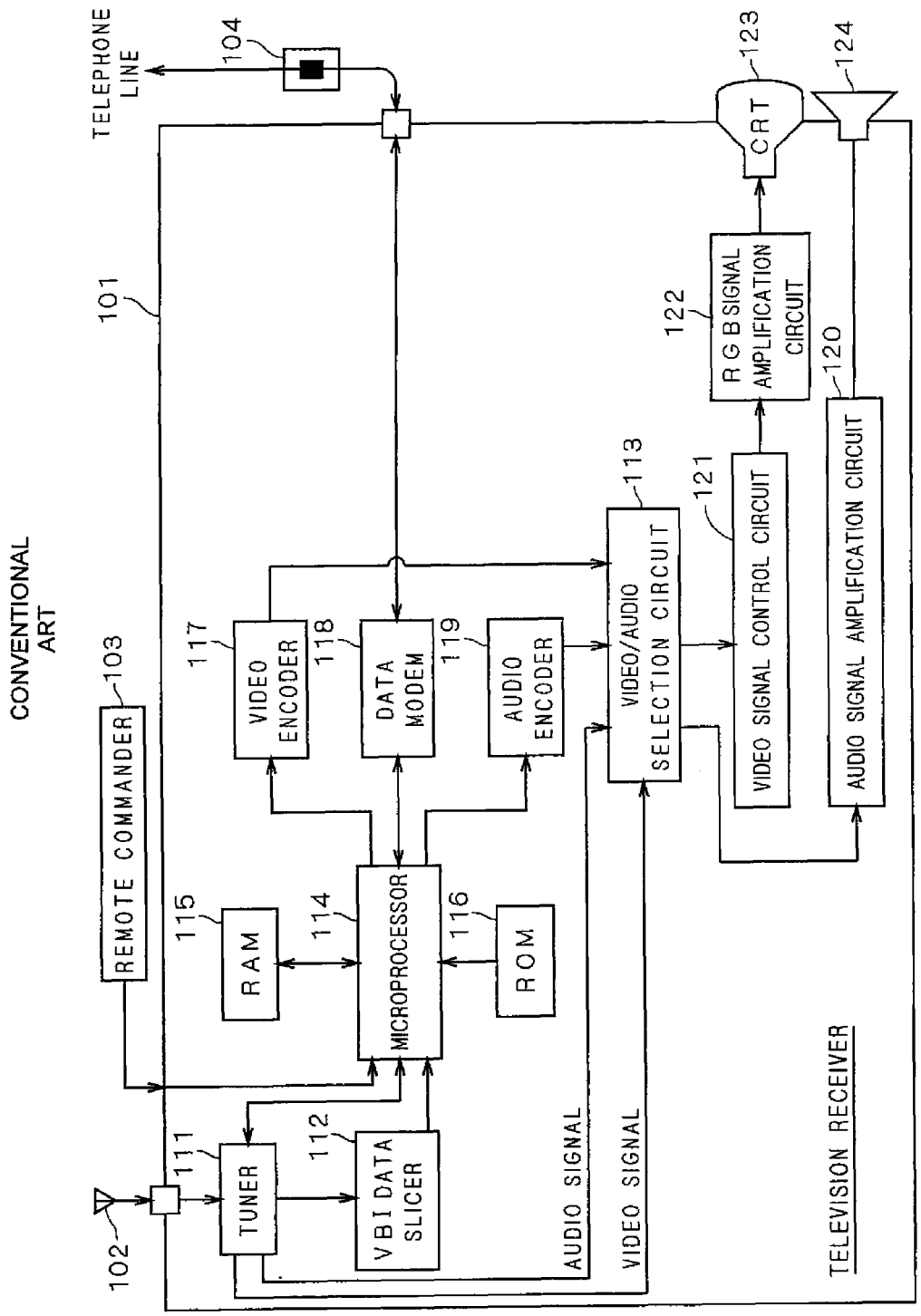
FIG. 9 is a block diagram that exemplifies a conventional construction.

FIG. 8 is a block diagram that shows the construction of a receiver 53 in accordance with the third preferred embodiment of the present invention. The receiver 53 has an arrangement in which a storage section 5 is added to the arrangement of the receiver 52 of the second preferred embodiment. The storage section 5 is allowed to store the output of the TV broadcast receiving section 1 for a predetermined period of time.

In the same manner as the second preferred embodiment, the data code GC and the password data PW2 are stored in the password information storage section 14. However, the acquiring process of these is not necessarily carried out prior to the distribution of the corresponding TV broadcasting contents. This is because the above-mentioned contents are stored in the storage section 5 of the receiver 53.

Therefore, the receiver 53 makes it possible to normally display the contents without being limited by the time at which the contents are distributed. In this case, it is preferable not to provide the step S8 shown in FIG. 6. This arrangement is made because the user, who has stored the contents in the storage section 5 while suspending the judgment as to whether or not the contents are to be normally displayed, might desire to acquire the release information depending on its reputation given by another user who has viewed the normal contents.

In the case when the data code GC and the password data PW2 are obtained prior to the distribution of the corresponding TV broadcasting contents, the storage of the contents may be started with respect to the storage section 5 upon coincidence of the data code GC of the corresponding contents. This arrangement makes it possible to automatically store the information in the storage section. It is of course preferable to utilize the fact that the password data PW1 of the corresponding contents and the stored password data PW2 have a predetermined correlation with each other as the condition for starting the storage.

It is, of course, not necessary to install the storage section 5 in the receiver 53 as its integral part, and this may be prepared as a separated part.

Modified Example

In any of the first to third preferred embodiments, the contents received by the TV broadcast receiving section 1 may be data other than the TV broadcasting programs. For example, these may be music data, or program data, and in particular, in digital broadcasting, all information provided as digital information may be processed by the same method.

Moreover, it is not necessary to block a normal display with respect to all the contents on which the limitation information is multiplexed, and the present invention is applied to a case in which one portion thereof is not normally displayed. For example, the present invention may be applied to aspects in which, with respect to the contents of the TV broadcasting program whose story is complicated, only the last portion is not allowed to view unless the corresponding release information is obtained or in which with respect to the contents provided as music data, only one portion thereof is not allowed to listen to unless it is obtained.

While the invention has been shown and described in detail, the foregoing description is in all aspects illustrative and not restrictive. It is therefore understood that numerous other modifications and variations can be devised without departing from the scope of the invention.

What is claimed is:

1. A receiver comprising:
a receiving section for receiving a first communication signal constituting contents through a first communication system;
a transmitting and receiving section requesting a transmission of a second communication signal containing release information and a screen data, and receiving said second communication signal through a second communication system enabling bi-directional communications;
a display signal generation section for converting said screen data received from said second communication system into a display signal;
a matching correlation detection section for making a judgment as to whether or not said release information has a predetermined matching correlation with limitation information for limiting a normal output of said contents; and
an output section refraining from normally outputting at least one portion of said contents when said predetermined matching correlation is not detected, and outputting said contents normally when said predetermined matching correlation is detected, said output section supplied with said display signal to output said screen data.

2. The receiver according to claim 1, wherein said first communication signal contains transmission source information for specifying a transmission source in order to obtain said release information that has said predetermined matching correlation with limitation information corresponding to said contents constituted by said first communication signal, and
wherein said receiver receives said second communication signal automatically by obtaining said transmission source information contained in said first communication signal.

3. The receiver according to claim 1, further comprising:
a storing section for storing said release information and discrimination information for discriminating said contents,
wherein said receiver receives said contents corresponding to said discrimination information stored in said storage section as said first communication signal, and, outputs said contents normally when said release information stored in said storage section and said limitation information corresponding to said contents have said predetermined matching correlation.

4. The receiver according to claim 3, further comprising an accumulation section for accumulating said first communication signal.

5. The receiver according to claim 4, wherein said storage section stores said first communication signal on condition that said contents corresponding to said discrimination information stored in said storage section as said first communication signal.

6. The receiver according to claim 5, wherein said storage section stores said first communication signal on additional condition that said release information stored in said storage section and said limitation information corresponding to said contents have said predetermined matching correlation.

7. The receiver according to claim 1, wherein said first communication signal contains said limitation information corresponding to said contents constituted by said first communication signal.

8. The receiver according to claim 1, wherein said output section indicates that said communication is being carried out through said second communication system upon request and receipt of said second communication signal.

9. The receiver according to claim 1, wherein said contents include video data.

10. The receiver according to claim 1, wherein said contents include music data.

11. The receiver according to claim 1, wherein said contents include program data.

12. A distribution method of release information comprising the steps of:
when release information has a predetermined matching correlation with limitation information for limiting a normal output of contents supplied through a first communication system, distributing said release information for allowing said contents to be normally outputted with a screen data through a second communication system enabling bi-directional communications; and
outputting said contents and said screen data to be displayed.

13. The distribution method according to claim 12, wherein the distribution of said release information is executed in response to a predetermined request.

14. A distribution method of contents, which distributes said contents through a first communication system, comprising the steps of:
supplying said contents together with transmission source information for specifying a transmission source for a second communication system that enables bi-directional communications; and obtaining release information which allows said contents to be normally outputted and a screen data which indicates information of said transmission source from said transmission source when said release information has a predetermined matching correlation with limitation information for limiting a normal output of said contents.

15. The distribution method of contents according to claim 14, wherein said contents are distributed together with said limitation information corresponding to said contents.

* * * * *